United States Patent
Zhang et al.

(10) Patent No.: US 9,946,605 B2
(45) Date of Patent: Apr. 17, 2018

(54) SYSTEMS AND METHODS FOR TAKING SNAPSHOTS IN A DEDUPLICATED VIRTUAL FILE SYSTEM

(71) Applicant: Veritas Technologies LLC, Mountain View, CA (US)

(72) Inventors: Xianbo Zhang, Plymouth, MN (US); Haigang Wang, Shoreview, MN (US); Shuangmin Zhang, Beijing (CN); Jeffrey Van Voorst, Shakopee, MN (US); Weibao Wu, Vadnais Heights, MN (US); Sameer Kulkarni, Minneapolis, MN (US); Nilesh Joshi, Roseville, MN (US); Kai Li, Beijing (CN); Yun Yang, Beijing (CN); Scott Brons, Eden Prairie, MN (US)

(73) Assignee: Veritas Technologies LLC, Mountain View, CA (US)

( * ) Notice: Subject to any disclaimer, the term of this patent is extended or adjusted under 35 U.S.C. 154(b) by 213 days.

(21) Appl. No.: 14/952,831

(22) Filed: Nov. 25, 2015

(65) Prior Publication Data

US 2017/0147446 A1 May 25, 2017

(51) Int. Cl.
G06F 7/00 (2006.01)
G06F 11/14 (2006.01)
G06F 17/30 (2006.01)
G06F 3/06 (2006.01)

(52) U.S. Cl.
CPC ........ *G06F 11/1453* (2013.01); *G06F 3/0617* (2013.01); *G06F 3/0641* (2013.01); *G06F 3/0646* (2013.01); *G06F 3/0683* (2013.01); *G06F 17/30088* (2013.01); *G06F 17/30156* (2013.01); *G06F 17/30233* (2013.01); *G06F 17/30371* (2013.01); *G06F 2201/84* (2013.01)

(58) Field of Classification Search
CPC ................................................ G06F 17/30088
See application file for complete search history.

(56) References Cited

U.S. PATENT DOCUMENTS

| 6,484,186 | B1 | 11/2002 | Rungta |
| 8,914,595 | B1 | 12/2014 | Natanzon |
| 2012/0221817 | A1 | 8/2012 | Yueh |

*Primary Examiner* — Ajith Jacob
(74) *Attorney, Agent, or Firm* — FisherBroyles LLP

(57) ABSTRACT

A computer-implemented method for taking snapshots in a deduplicated virtual file system may include (1) maintaining a deduplicated virtual file system that stores, at an original location within a non-virtual file system, at least one configuration file storing metadata for a target file and an extent map for the target file, the extent map defining how to construct the target file from deduplicated data segments in a deduplicated storage system, (2) receiving a request to take a snapshot of the target file corresponding to the configuration file, (3) copying the configuration file storing metadata for the target file and the extent map for the target file into a snapshot location within the non-virtual file system, and (4) transmitting a file reference request to the deduplicated storage system to add a file reference within the deduplicated storage system. Various other methods, systems, and computer-readable media are also disclosed.

20 Claims, 8 Drawing Sheets

SYSTEMS AND METHODS FOR TAKING SNAPSHOTS IN A DEDUPLICATED VIRTUAL FILE SYSTEM

BACKGROUND

Individuals and organizations typically seek to protect their private data using a variety of data protection mechanisms. One traditional method for protecting an enterprise organization's data corresponds to taking a "snapshot" of that data. In general, a "snapshot" may refer to any one of several different mechanisms for storing data that preserve the exact content of the data at a specific point in time.

Additionally, as the size of an enterprise organization's data grows, the organization may attempt to address storage space concerns in a variety of ways. For example, the organization may increase physical capacity or implement a form of data compression. In a more specific example, the organization may implement a deduplication system that effectively compresses data by reducing redundant copies of repeated data segments, as discussed further below. Nevertheless, traditional systems for taking snapshots in deduplicated data systems have proven to be non-optimal along a number of dimensions. Specifically, traditional systems may be unduly slow, may degrade in performance as the frequency of taking snapshots increases, and may render snapshots dependent on each other such that modifying or deleting one snapshot needlessly impacts another snapshot. Accordingly, the instant disclosure identifies and addresses a need for additional and improved systems and methods for taking snapshots in a deduplicated virtual file system.

SUMMARY

As will be described in greater detail below, the instant disclosure generally relates to systems and methods for taking snapshots in a deduplicated virtual file system by, for example, copying the non-virtual configuration file or files that store metadata and the extent map for a corresponding target file (i.e., targeted for snapshotting) and also transmitting a file reference request to an associated deduplicated storage system, as discussed further below. In one example, a computer-implemented method for storing data may include (1) maintaining a deduplicated virtual file system that stores, at an original location within a non-virtual file system, at least one configuration file storing metadata for a target file and an extent map for the target file, the extent map defining how to construct the target file from deduplicated data segments in a deduplicated storage system, (2) receiving a request to take a snapshot of the target file corresponding to the configuration file, (3) copying, in response to receiving the request to take the snapshot of the target file, the configuration file storing metadata for the target file and the extent map for the target file into a snapshot location within the non-virtual file system that is different than the original location, and (4) transmitting, in response to receiving the request to take the snapshot of the target file, a file reference request to the deduplicated storage system to add a file reference within the deduplicated storage system, the file reference indicating that the snapshot of the target file references at least one deduplicated data segment within the deduplicated storage system.

In one embodiment, the configuration file stores at least the metadata for the target file and the original location of the configuration file includes a metadata directory. In one embodiment, the configuration file stores at least the extent map for the target file and the original location of the configuration file includes a map directory.

In one example, the original location of the configuration file may include a directory and the snapshot location of the configuration file may include a subdirectory of the directory. In another embodiment, the subdirectory of the directory is created in response to receiving the request to take the snapshot. In some examples, creating the subdirectory of the directory may include assigning the subdirectory a name of the snapshot that was assigned to the snapshot prior to creating the subdirectory.

In one embodiment, the configuration file may correspond to multiple files including both a file storing the metadata for the target file and a separate file storing the extent map for the target file. In another embodiment, the computer-implemented method may further include identifying, by the deduplicated storage system, the deduplicated data segment referenced by the snapshot of the target file and marking, by the deduplicated storage system, the deduplicated data segment as referenced by the snapshot of the target file to prevent removal of the deduplicated data segment. In a further embodiment, the computer-implemented method may include marking, by the deduplicated storage system, each deduplicated data segment referenced by the snapshot of the target file as referenced by the snapshot of the target file to prevent removal of the respective deduplicated data segment.

In one embodiment, the computer-implemented method may further include modifying content of the snapshot. After modifying the snapshot, the computer-implemented method may further include modifying the extent map stored at the snapshot location to reference both (1) an additional deduplicated data segment that the snapshot newly references due to the modifying and (2) an additional deduplication container storing the additional deduplicated data segment separate from an original deduplication container storing the deduplicated data segment of the snapshot prior to the modifying.

In one embodiment, a system for implementing the above-described method may include (1) a maintenance module, stored in memory, that maintains a deduplicated virtual file system that stores, at an original location within a non-virtual file system, at least one configuration file storing metadata for a target file and an extent map for the target file, the extent map defining how to construct the target file from deduplicated data segments in a deduplicated storage system, (2) a reception module, stored in memory, that receives a request to take a snapshot of the target file corresponding to the configuration file, (3) a copying module, stored in memory, that copies, in response to receiving the request to take the snapshot of the target file, the configuration file storing metadata for the target file and the extent map for the target file into a snapshot location within the non-virtual file system that is different than the original location, (4) a transmission module, stored in memory, that transmits, in response to receiving the request to take the snapshot of the target file, a file reference request to the deduplicated storage system to add a file reference within the deduplicated storage system, the file reference indicating that the snapshot of the target file references at least one deduplicated data segment within the deduplicated storage system, and (5) at least one physical processor configured to execute the maintenance module, the reception module, the copying module, and the transmission module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) maintain a deduplicated virtual file system that stores, at an original location within a non-virtual file system, at least one configuration file storing metadata for a target file and an extent map for the target file, the extent map defining how to construct the target file from deduplicated data segments in a deduplicated storage system, (2) receive a request to take a snapshot of the target file corresponding to the configuration file, (3) copy, in response to receiving the request to take the snapshot of the target file, the configuration file storing metadata for the target file and the extent map for the target file into a snapshot location within the non-virtual file system that is different than the original location, and (4) transmit, in response to receiving the request to take the snapshot of the target file, a file reference request to the deduplicated storage system to add a file reference within the deduplicated storage system, the file reference indicating that the snapshot of the target file references at least one deduplicated data segment within the deduplicated storage system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
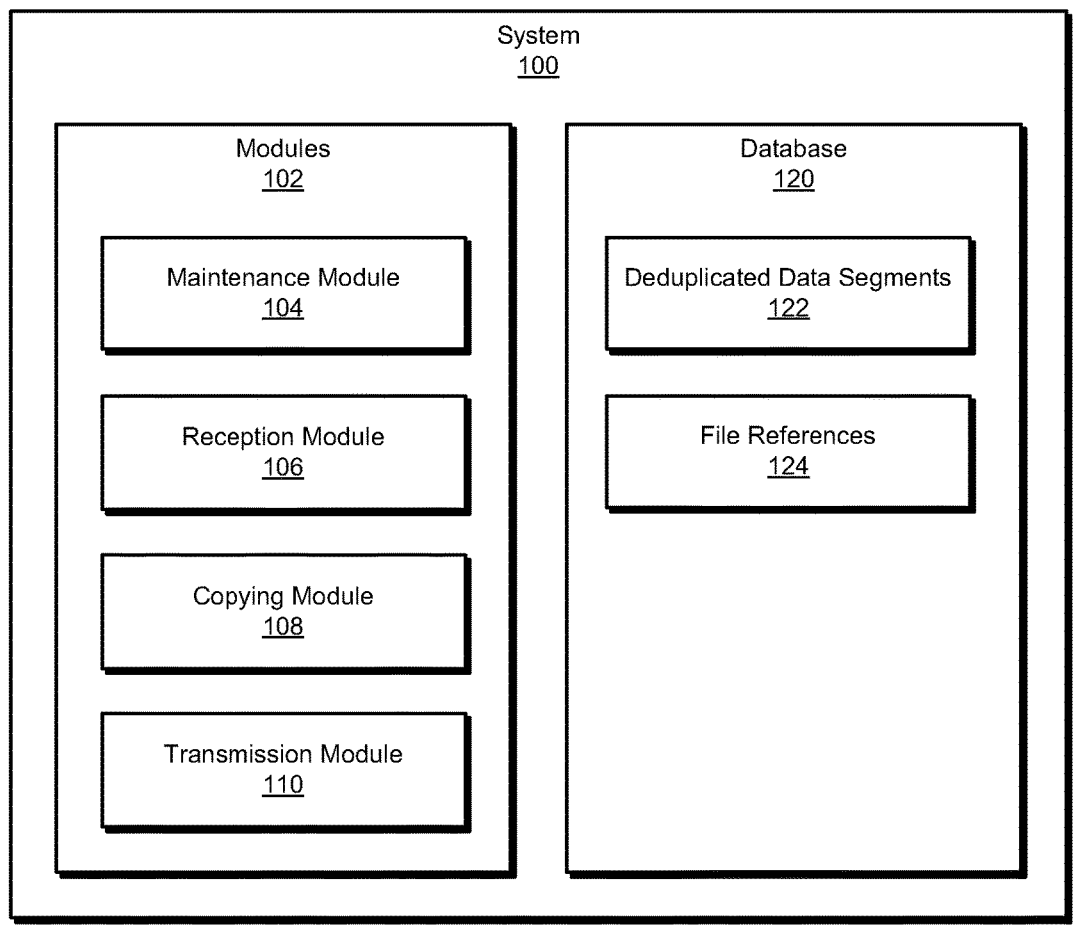
FIG. 1 is a block diagram of an exemplary system for taking snapshots in a deduplicated virtual file system.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for taking snapshots in a deduplicated virtual file system. As will be explained in greater detail below, the disclosed systems and methods may improve the speed of taking snapshots in deduplicated virtual file systems. Additionally, the disclosed systems and methods may prevent the degradation of performance of taking snapshots as the frequency of taking snapshots increases. Furthermore, the disclosed systems and methods may enable snapshots to be independent of each other such that modifying or deleting one snapshot does not necessarily impact another, as discussed further below.

Figure 2:
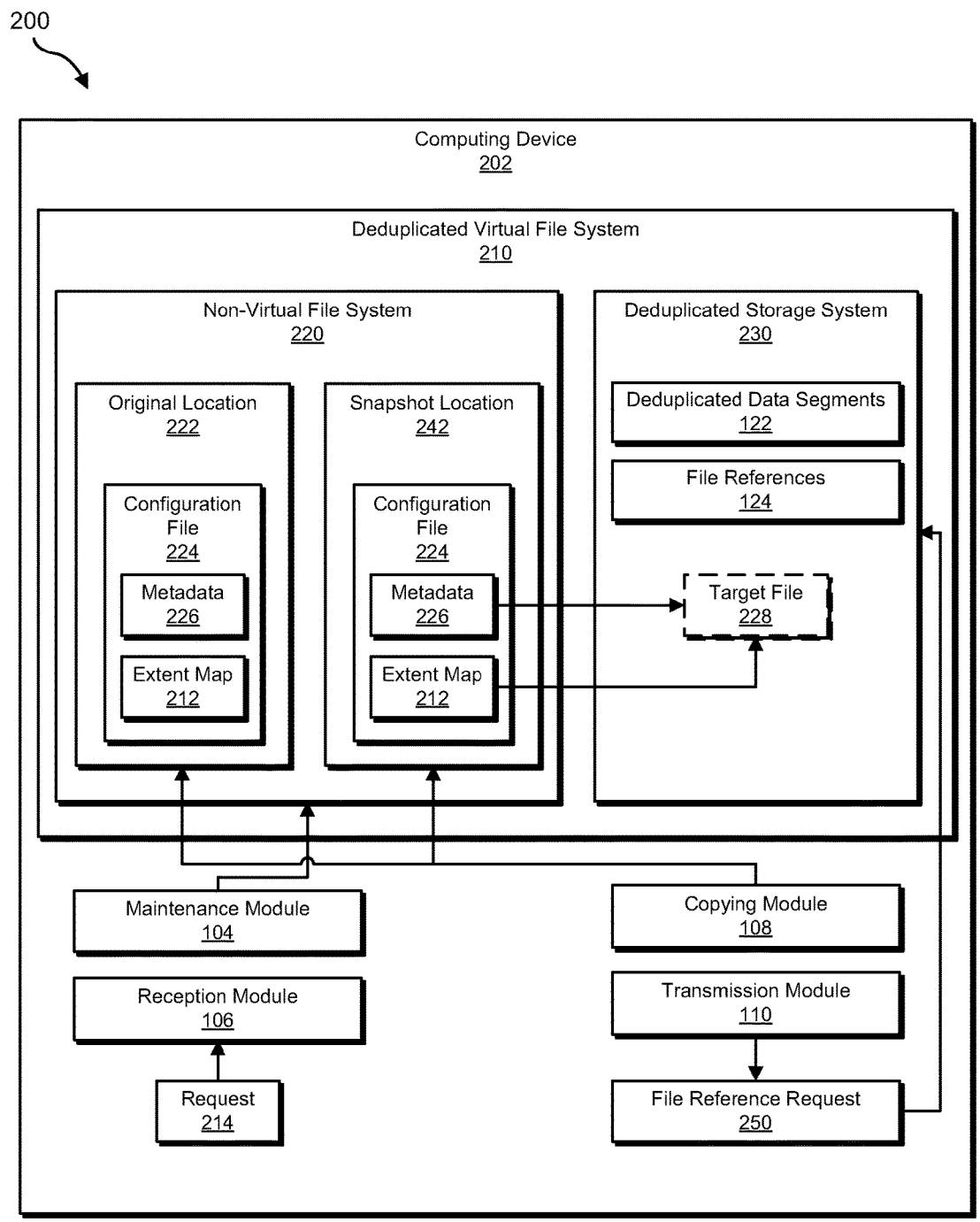
FIG. 2 is a block diagram of an additional exemplary system for taking snapshots in a deduplicated virtual file system.

The following will provide, with reference to FIGS. 1-2, detailed descriptions of exemplary systems for taking snapshots in a deduplicated virtual file system. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of exemplary system 100 for storing data. As illustrated in this figure, exemplary system 100 may include one or more modules 102 for performing one or more tasks. For example, and as will be explained in greater detail below, exemplary system 100 may also include a maintenance module 104 that may maintain a deduplicated virtual file system that stores, at an original location within a non-virtual file system, at least one configuration file storing metadata for a target file and an extent map for the target file. The extent map may define how to construct the target file from deduplicated data segments in a deduplicated storage system. Exemplary system 100 may additionally include a reception module 106 that may receive a request to take a snapshot of the target file corresponding to the configuration file.

Exemplary system 100 may also include a copying module 108 that may copy, in response to receiving the request to take the snapshot of the target file, the configuration file storing metadata for the target file and the extent map for the target file into a snapshot location within the non-virtual file system that is different than the original location. Exemplary system 100 may additionally include a transmission module 110 that may transmit, in response to receiving the request to take the snapshot of the target file, a file reference request to the deduplicated storage system to add a file reference within the deduplicated storage system. The file reference may indicate that the snapshot of the target file references at least one deduplicated data segment within the deduplicated storage system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 710 in FIG.

Figure 8:
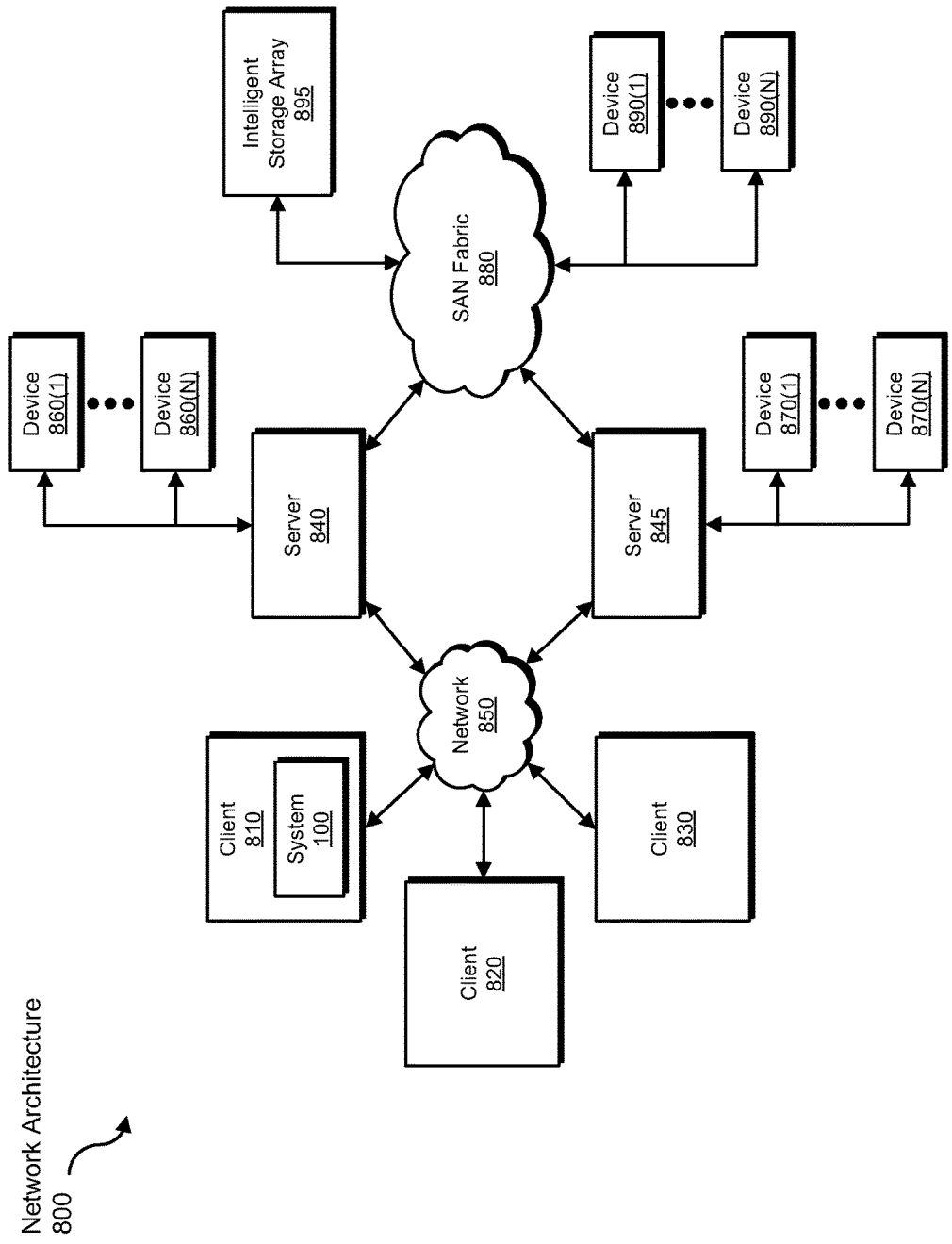
FIG. 8 is a block diagram of an exemplary computing network capable of implementing one or more of the embodiments described and/or illustrated herein.

7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store deduplicated data segments 122, which may correspond to unique portions of data that the deduplicated storage system uses to construct underlying non-virtual files, as discussed further below. Specifically, the deduplicated storage system may identify a portion of data within the non-virtual file that appears within the non-virtual file multiple times but store the portion of data within the deduplicated storage system only once (e.g., with corresponding metadata instructions indicating where to copy and repeat the portion), thereby potentially reducing storage space. As further shown in the figure, database 120 may also be configured to store file references 124, which may indicate which files reference which deduplicated data segments, thereby preventing removal of data segments that the virtual file system needs to reconstruct corresponding non-virtual files.

Database 120 may represent portions of a single database or computing device or a plurality of databases or computing devices. For example, database 120 may represent a portion of computing system 710 in FIG. 7, and/or portions of exemplary network architecture 800 in FIG. 8. Alternatively, database 120 in FIG. 1 may represent one or more physically separate devices capable of being accessed by a computing device, such as computing system 710 in FIG. 7 and/or portions of exemplary network architecture 800 in FIG. 8.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, computing device 202 may be programmed with one or more of modules 102 and/or may store all or a portion of the data in database 120.

In one embodiment, one or more of modules 102 from FIG. 1 may, when executed by at least one processor of computing device 202, enable computing device 202 to take snapshots in a deduplicated virtual file system. For example, and as will be described in greater detail below, maintenance module 104 may maintain a deduplicated virtual file system 210 that stores, at an original location 222 within a non-virtual file system 220, at least one configuration file 224 storing metadata 226 for a target file 228 and an extent map 212 for target file 228. Extent map 212 may define how to construct target file 228 from deduplicated data segments 122 in a deduplicated storage system 230. Reception module 106 may receive a request 214 to take a snapshot of target file 228 corresponding to configuration file 224. Copying module 108 may copy, in response to receiving request 214 to take the snapshot of target file 228, configuration file 224 storing metadata 226 for target file 228 and extent map 212 for target file 228 into a snapshot location 242 within non-virtual file system 220 that is different than original location 222. Transmission module 110 may transmit, in response to receiving request 214 to take the snapshot of target file 228, a file reference request 250 to deduplicated storage system 230 to add a file reference within deduplicated storage system 230. The file reference may indicate that the snapshot of target file 228 references at least one deduplicated data segment within deduplicated storage system 230.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 710 in FIG. 7, or any other suitable computing device.

Figure 3:
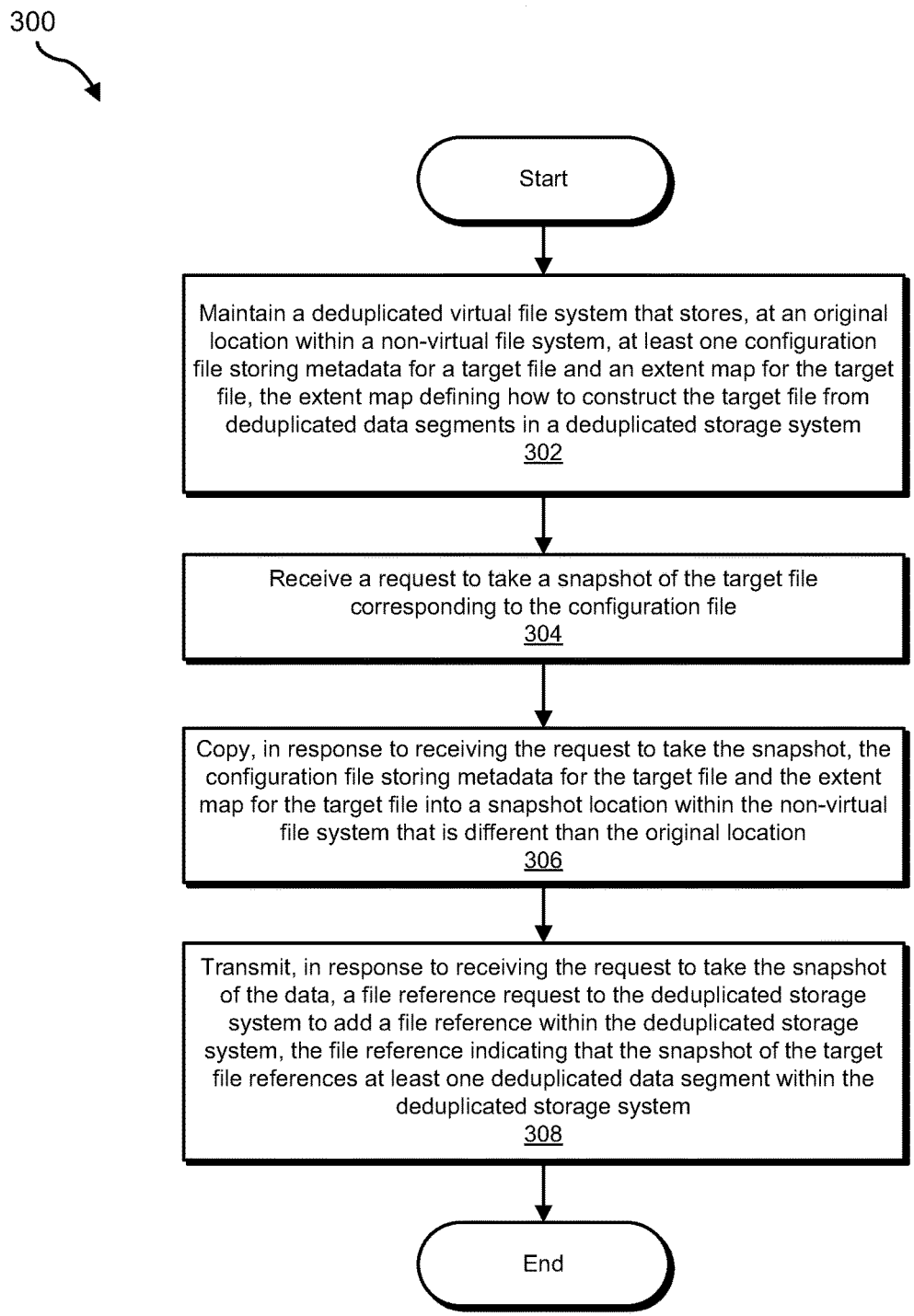
FIG. 3 is a flow diagram of an exemplary method for taking snapshots in a deduplicated virtual file system.

FIG. 3 is a flow diagram of an exemplary computer-implemented method 300 for taking snapshots in a deduplicated virtual file system. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302, one or more of the systems described herein may maintain a deduplicated virtual file system that stores, at an original location within a non-virtual file system, at least one configuration file storing metadata for a target file and an extent map for the target file, the extent map defining how to construct the target file from deduplicated data segments in a deduplicated storage system. For example, maintenance module 104 may, as part of computing device 202 in FIG. 2, maintain deduplicated virtual file system 210 that stores, at original location 222 within non-virtual file system 220, configuration file 224 storing metadata 226 for target file 228 and/or extent map 212 for target file 228.

As used herein, the term "deduplicated virtual file system" generally refers to a storage system that deduplicates data by storing deduplicated data segments within an associated deduplicated storage system and storing corresponding metadata and file reconstruction information (e.g., extent map 212, which indicates how to reconstruct target file 228) within a conventional, non-virtual, and/or non-deduplicated file system. Moreover, as used herein, the term "non-virtual file system" simply refers to any file system that does not constitute a "deduplicated virtual file system," as outlined above. Notably, as used herein, the term "deduplicated virtual file system" refers to an overall files system, or "meta-file-system" that leverages both a conventional or non-virtual file system (i.e., for storing configuration, metadata, and/or extent map information) and a deduplicated storage system (i.e., for storing the deduplicated data segments).

Additionally, as used herein, the term "location" generally refers to any location, such as a directory, within a file system for storing data. Furthermore, as used herein, the term "target file" simply refers to any file that becomes the target for taking a snapshot in accordance with method 300, as outlined further below.

Additionally, as used herein, the term "metadata" generally refers to data describing attributes of files stored using the deduplicated storage system. Items of metadata may include timestamps and file size values, for example. Furthermore, as used herein, the term "extent map" generally refers to any map that defines how to reconstruct a file that has been deduplicated from deduplicated data segments stored within the corresponding deduplicated storage system (e.g., maps logical file blocks to deduplicated data segments).

Maintenance module 104 may maintain the deduplicated virtual file system in a variety of ways. In general, maintenance module 104 may maintain the deduplicated virtual file system by providing or implementing the deduplicated virtual file system. For example, maintenance module 104 may maintain the deduplicated virtual file system by optionally deduplicating data and then storing the deduplicated data segments within an associated deduplicated storage system, such as deduplicated storage system 230, as well as storing the associated metadata and/or extent map within a non-virtual file system, as discussed above.

In some examples, the configuration file stores at least the metadata for the target file and the original location of the configuration file includes a metadata directory. For example, the metadata directory may be assigned the name or identifier "head." Additionally, or alternatively, the configuration file stores at least the extent map for the target file and the original location of the configuration file includes a map directory. For example, the map directory may be assigned the name or identifier "map." Moreover, the configuration file may correspond to multiple files, which include both a file storing the metadata for the target file and a separate file storing the extent map for the target file.

Furthermore, in some examples, the original location of the configuration file includes a directory and the snapshot location of the configuration file includes a subdirectory of the directory. Additionally, in further examples, the configuration file may be automatically assigned, by the deduplicated virtual file system, the same file name as the target file.

Figure 4:
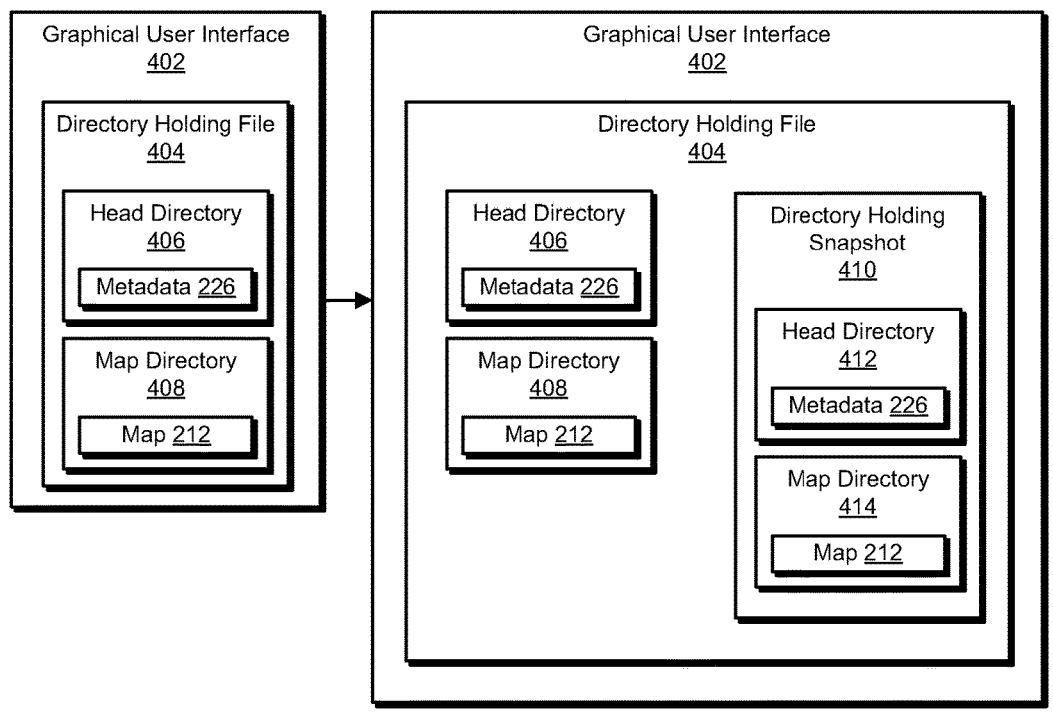
FIG. 4 is a block diagram of an exemplary graphical user interface for taking snapshots in a deduplicated virtual file system.

FIG. 4 shows, on the left side, a graphical user interface 402 that further displays a directory 404, which corresponds to original location 222. Directory 404 may store the original version of target file 228 by storing metadata 226 and extent map 212 that references the deduplicated stored system. As further shown in this figure, directory 404 may also store a head directory 406 and a map directory 408 (i.e., as subdirectories of directory 404), which may store metadata 226 and extent map 212, respectively. FIG. 4 will also be discussed in further detail regarding step 306 of method 300.

At step 304, one or more of the systems described herein may receive a request to take a snapshot of the target file corresponding to the configuration file. For example, reception module 106 may, as part of computing device 202 in FIG. 2, receive request 214 to take the snapshot of target file 228 corresponding to configuration file 224.

Reception module 106 may receive the request to take the snapshot of the target file in any suitable manner. In general, reception module 106 may receive input from a user, administrator, and/or another software component in a manual, automated, or semi-automated manner. A user may issue the request to take the snapshot of the target file using any suitable input device, such as a mouse or keyboard. Additionally, or alternatively, reception module 106 may receive the request to take the snapshot of the target file in accordance with a predefined schedule and/or data backup policy.

At step 306, one or more of the systems described herein may copy, in response to receiving the request to take the snapshot of the target file, the configuration file storing metadata for the target file and the extent map for the target file into a snapshot location within the non-virtual file system that is different than the original location. For example, copying module 108 may, as part of computing device 202 in FIG. 2, copy, in response to receiving request 214 to take the snapshot of target file 228, configuration file 224 storing metadata 226 for target file 228 and extent map 212 for target file 228 into snapshot location 242 within non-virtual file system 220 that is different than original location 222.

As used herein, the term "snapshot location" generally refers to any location, such as a file system directory or subdirectory, that becomes the location for storing metadata 226 and/or extent map 212 for the snapshot, as distinct from the original location or locations for the original target file from which the snapshot is taken. As shown in FIG. 4, on the right side, copying module 108 has copied metadata 226 and extent map 212 from directory 404 into another directory 410. Specifically, copying module 108 has created directory 410 as a subdirectory under directory 404. Additionally, copying module 108 has also created copies of head directory 406 and map directory 408 in the form of a head directory 412 and a map directory 414, which constitute subdirectories under directory 410.

In these examples, each head directory may store a metadata file for every deduplicated file originally stored in the directory under which the head directory is a subdirectory. Similarly, each map directory may store an extent map file for every deduplicated file originally stored in the directory under which the map directory as a subdirectory. In other embodiments, the metadata file and the extent map file may be combined into a single file. Similarly, in other embodiments, the metadata file and/or the extent map file for one deduplicated file may be combined with the metadata file and/or the extent map file for another deduplicated file. In general one or more of these items of information may be aggregated into one or more centralized files.

In the example of FIG. 4, directory 410 may correspond to snapshot location 242. Moreover, copying module 108 may create snapshot location 242 (e.g., directory 410) in response to reception of the request to take the snapshot of the target file. Additionally, copying module 108 may assign or label directory 410 with a name or label of the snapshot that was previously assigned to the snapshot prior to creation of directory 410. Notably, in this example, snapshot location 242 constitutes a subdirectory of original location 222, but in other examples snapshot location 242 may constitute a separate directory or other location outside of the original location and/or the original directory.

At step 308, one or more of the systems described herein may transmit, in response to receiving the request to take the snapshot of the target file, a file reference request to the deduplicated storage system to add a file reference within the deduplicated storage system. The file reference may indicate that the snapshot of the target file references at least one deduplicated data segment within the deduplicated storage system. For example, transmission module 110 may, as part of computing device 202 in FIG. 2, transmit, in response to receiving request 214 to take the snapshot of target file 228, file reference request 250 to deduplicated storage system 230 to add a file reference within deduplicated storage system 230.

As used herein, the term "file reference request" generally refers to any request to a deduplicated storage system to recognize that a corresponding file references one or more deduplicated data segments stored by the deduplicated storage system. In other words, the deduplicated virtual file system needs the corresponding deduplicated data segments to reconstruct or reproduce the file and so the deduplicated storage system should not delete those data segments.

Transmission module 110 may transmit the file reference request in a variety of ways. For example, transmission module 110 may instruct the deduplicated storage system, in response to receiving the file reference request, to identify at least one deduplicated data segment, such as segment 504, referenced by the snapshot of the target file. Additionally, transmission module 110 may instruct the deduplicated storage system, in response to receiving the file reference request, to mark (e.g., mark within file references 124) the deduplicated data segment as referenced by the snapshot of the target file to prevent removal of the deduplicated data segment. In further examples, transmission module 110 may instruct the deduplicated storage system to similarly mark each and every deduplicated data segment referenced by the snapshot of the target file.

Figure 5:
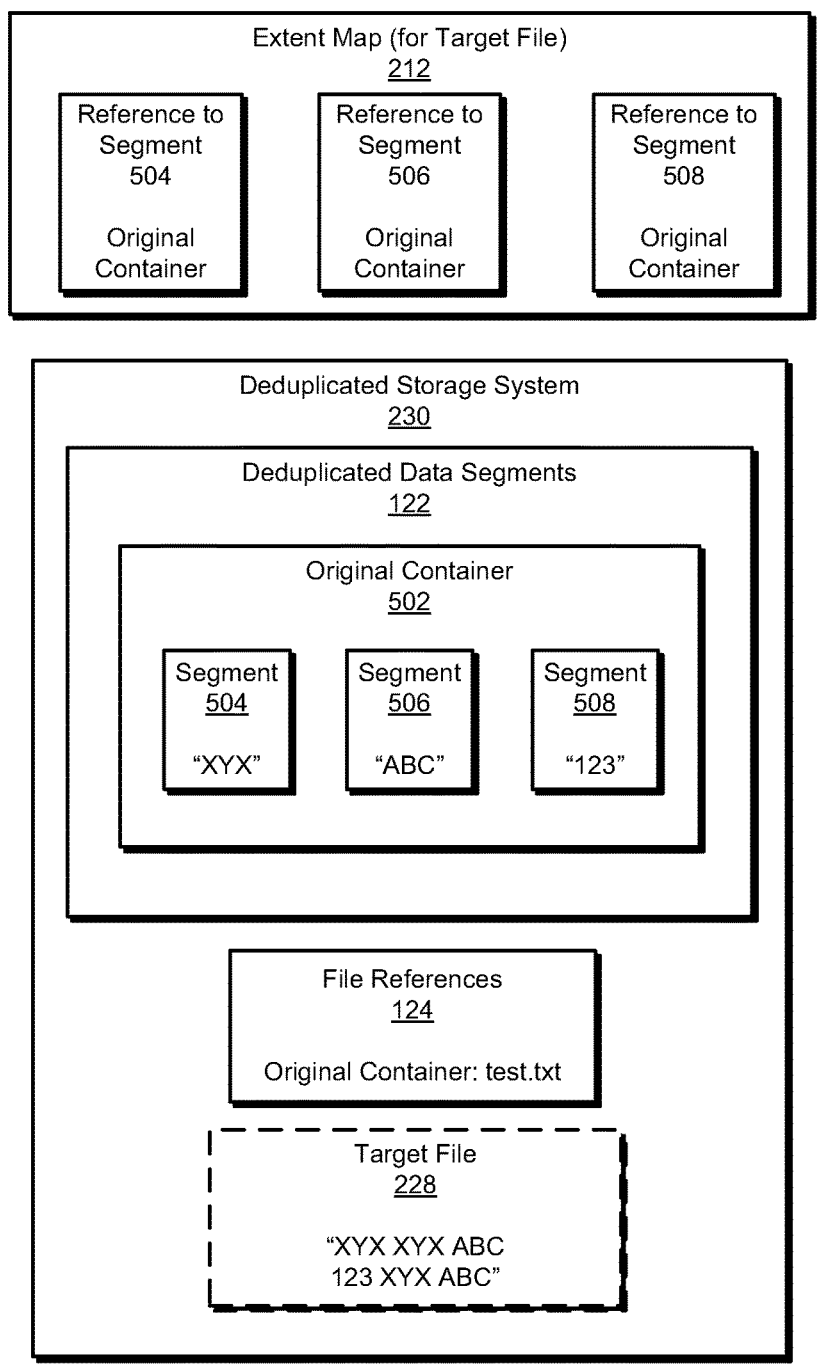
FIG. 5 is a block diagram illustrating an extent map and deduplicated storage system prior to taking a snapshot and modifying the snapshot.
Figure 6:
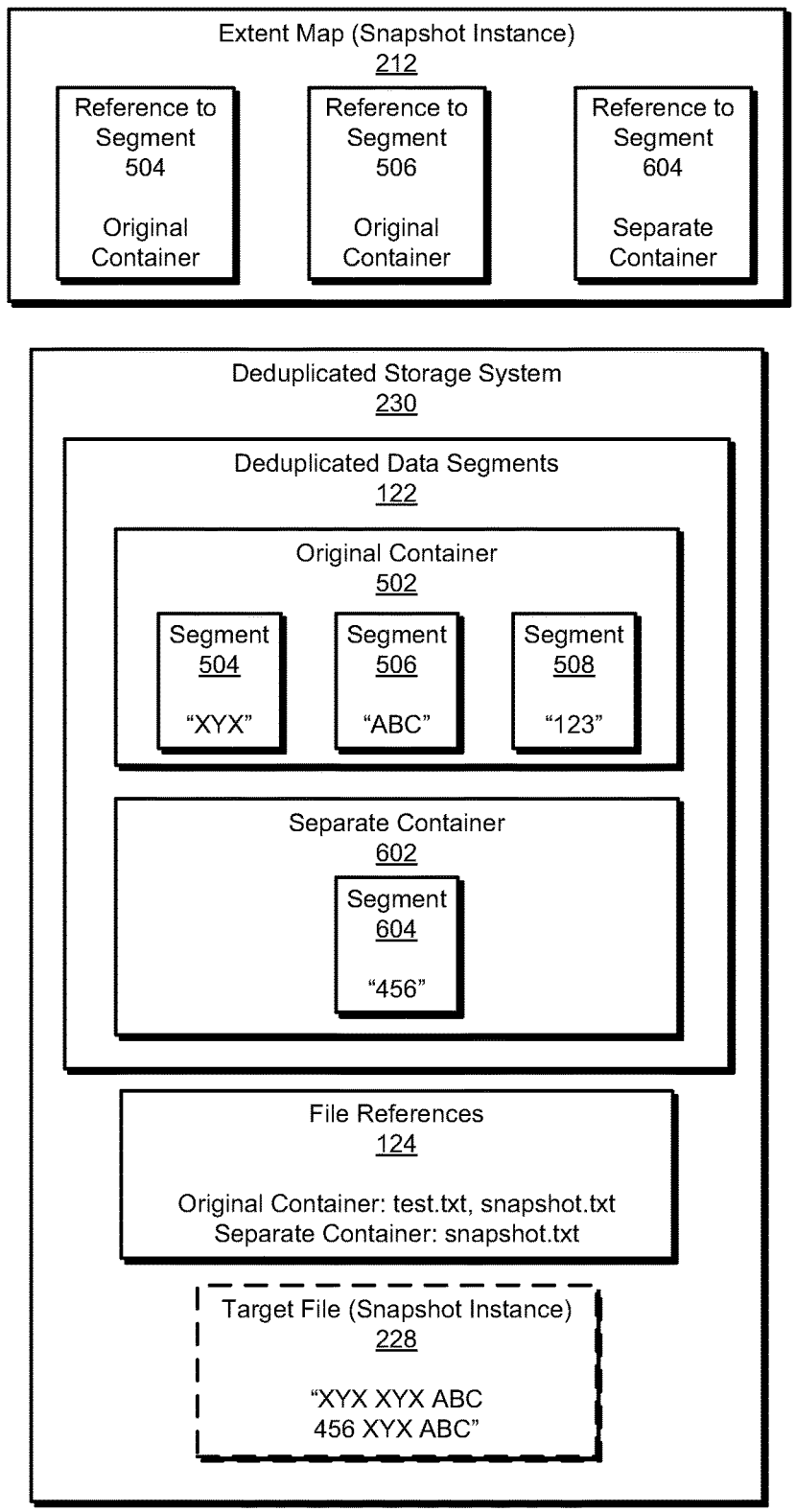
FIG. 6 is a block diagram illustrating an extent map and deduplicated storage system after taking the snapshot and modifying the snapshot.

To help understand how transmission module 110 performs step 308, FIGS. 5 and 6 show file references 124 within deduplicated storage system 230. In FIG. 5, reception module 104 has not yet received the request to take the snapshot of the target file. As shown in this figure, deduplicated storage system 230 may store deduplicated data segments 122, which may further include an original container 502 that stores all of the deduplicated data segments referenced by the original version of target file 228. As further shown in this figure, which is simplified for illustration purposes, target file 228 (when reconstructed from underlying data segments) is composed of strings of text, some of which are repeated or duplicated throughout target file 228. Specifically, the reconstructed version of target file 228 includes multiple instances of the string "XYX" and the string "ABC." Accordingly, deduplicated storage system 230 has deduplicated target file 228 by only storing a single instance of a segment 504 ("XYX"), a single instance of a segment 506 ("ABC"), and a single instance of a segment 508 ("123"). (The dashed lines around target file 228 in FIG. 5 indicate that the non-deduplicated version of the file is not actually stored within deduplicated storage system 230; instead, sufficient information for reconstructing the file from deduplicated data segments 122 is stored within extent map 212, as discussed above.)

Configuration or reconstruction information for reconstructing target file 228 from these data segments may be stored within extent map 212, as further shown in this figure. Specifically, extent map 212 may include a reference to a segment 504, and an indication that segment 504 is stored within original container 502, a reference to segment 506, and an indication that segment 506 is stored within original container 502, and a reference to segment 508, and an indication that segment 508 is stored within original container 502. Extent map 212 may also include information on the locations and/or repetitions within target file 228 where these data segments should be inserted, located, and/or copied to effectively reconstruct target file 228.

In the example of FIG. 5, file references 124 may indicate which files reference which deduplication containers, such as original container 502. In other examples, file references 124 may more specifically or granularly indicate, not just which files reference which deduplication containers, but also (additionally or alternatively) indicate which files reference which specific data segments. As used herein, the term "deduplicated container" generally refers to any logical container, directory, and/or location within a file system or other storage for storing deduplicated data segments as an aggregated set.

In contrast to FIG. 5, FIG. 6 shows how extent map 212 and deduplicated storage system 230 may be updated after all of the following: (1) the snapshot is taken of the target file (e.g., in response to the request received as step 304) and (2) the snapshot of the target file is modified, as discussed further below. Specifically, file references 124 show that, after taking the snapshot of the original target file, the snapshot has been modified by substituting the string "456" for the string "123" previously stored at the same location within the target file. Accordingly, file references 124 have been updated to show that original container 502 is referenced by the original target file ("test.txt" in this example), because the original target file still references segment 504, segment 506, and segment 508, as previously shown in FIG. 5. Similarly, file references 124 have been updated to show that original container 502 is referenced by the modified snapshot ("snapshot.txt"), because the modified snapshot still references segment 504 and segment 506, even if the modified snapshot no longer references segment 508.

Furthermore, file references 124 have been updated to show that a separate container 602, which corresponds to the modified writable snapshot ("snapshot.txt"), is referenced by the modified writable snapshot, because the modified snapshot now references a segment 604 within separate container 602. Moreover, the instance of extent map 212 for the snapshot has also been modified to include a reference to segment 604 instead of a reference to segment 508. As further shown in FIG. 6, extent map 212 also indicates that segment 604 is located within separate container 602 for the snapshot rather than original container 502 for the original target file. In other words, extent map 212 has been modified to indicate both (1) an additional deduplicated data segment that the snapshot newly references due to the modifying and (2) an additional deduplication container storing the additional deduplicated data segment (i.e., segment 604) separate from an original deduplication container storing the deduplicated data segment (e.g., segment 504) of the snapshot prior to the modifying.

As explained above in connection with method 300 in FIG. 3, the disclosed systems and methods may improve the speed of taking snapshots in deduplicated virtual file systems. Additionally, the disclosed systems and methods may prevent the degradation of performance of taking snapshots as the frequency of taking snapshots increases. Furthermore, the disclosed systems and methods may enable snapshots to be independent of each other such that modifying or deleting one snapshot does not necessarily impact another, as discussed further above.

The following provides a higher level overview of embodiments of the disclosed subject matter. During backup operations, a deduplicated virtual file system may be mounted to provide a backup destination (e.g., network file system destination) for a recovery manager (e.g., RMAN) to write control files, data files, transaction logs, archived logs, etc. Once a backup has completed, a snapshot is taken for the files created by the recovery manager. The deduplicated virtual file system may perform the following to complete a snapshot operation: (1) create a subdirectory with a snapshot ID as the directory name, (2) copy the head and map of the given set of files corresponding to the backup copy to the directory with the snapshot ID as its name, (3) generate and send file reference addition requests to deduplication storage for all files of the backup copy, and (4) deduplication storage will add file references to all referenced data segments. Once the backup snapshot is created, the recovery manager can perform a new backup to the backup destination with any file creation, update, deletion operation, etc. Any change will not impact existing backup snapshots.

During provisioning operations, a backup copy identified by a snapshot ID is chosen for provisioning. A provisioning operation performed by the deduplicated virtual file system has almost the same steps as creating a backup snapshot (with the exception, for example, that a backup snapshot is protected from modification whereas a provisioned snapshot is intended to be modifiable). Basically, (1) a new ID is generated to represent the provision copy and then a directory with the new ID as its name is created, (2) the head and the map of the backup copy are copied to the new ID directory, (3) file reference addition requests are generated and sent to the deduplication storage, and (4) segment references are added by the deduplication storage. After the snapshot has completed, the new writable snapshot may be mounted for test and development operations.

During test and development operations, file creation and deletion may introduce file reference additions and deletions to deduplication storage. File updates may introduce a file reference update request. The deduplication storage may dereference the old version of the file and add one or more references for the new version.

In summary, only a small amount of data including a copy of the metadata (e.g., metadata and/or extent map) and additional references, are needed to create a snapshot. This contrasts with systems that perform snapshots by reconstructing files from deduplicated segments and copying the reconstructed files. This also contrasts with systems that perform snapshots by copying deduplicated data segments. Instead, the disclosed systems and methods may simply copy the extent map that indicates how files may be reconstructed from the deduplicated data segments. Since the overhead of the deduplicated virtual file system snapshot operation is small, taking a snapshot is a very fast operation. Additionally, there may be no chain of relationship among snapshots. Accordingly, the performance of accessing snapshots does not degrade as the frequency of taking snapshots increases. Finally, each snapshot has its own references to segments (instead of snapshots sharing references to segments) and each snapshot can be removed without impacting any other snapshot. Moreover, the extent map may be implemented with a B+ tree that helps a storage system to quickly locate an extent with a given offset.

Figure 7:
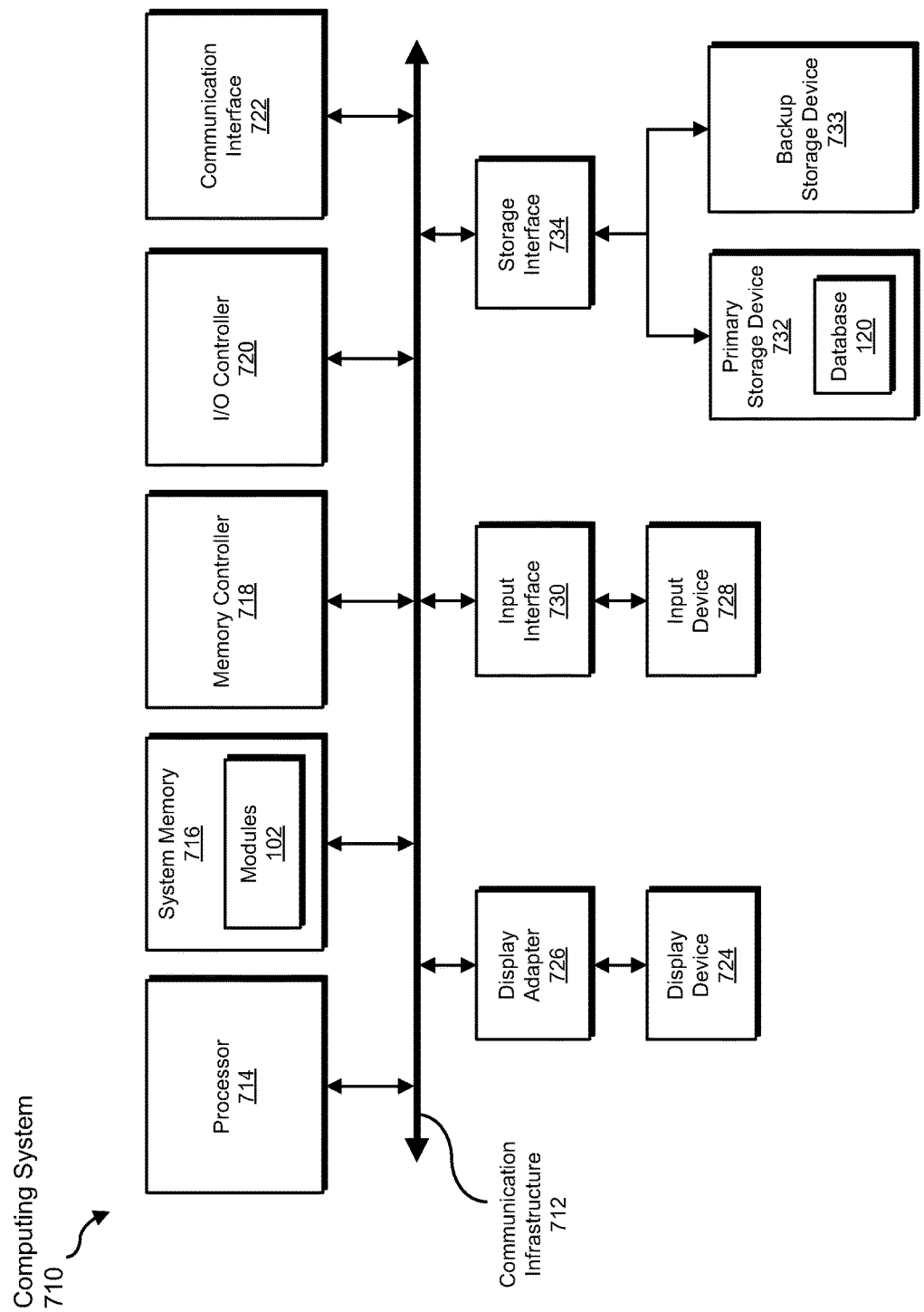
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for taking snapshots in a deduplicated virtual file system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for taking snapshots in a deduplicated virtual file system, at least a portion of the method being performed by a computing device comprising at least one processor, the method comprising:
    maintaining a deduplicated virtual file system that stores, at an original location within a non-virtual file system, at least one configuration file storing metadata for a target file and an extent map for the target file, the extent map defining how to construct the target file from deduplicated data segments in a deduplicated storage system;
    receiving a request to take a snapshot of the target file corresponding to the configuration file;
    copying, in response to receiving the request to take the snapshot of the target file, the configuration file storing metadata for the target file and the extent map for the target file into a snapshot location within the non-virtual file system that is different than the original location;
    transmitting, in response to receiving the request to take the snapshot of the target file, a file reference request to the deduplicated storage system to add a file reference within the deduplicated storage system, the file reference indicating that the snapshot of the target file references at least one deduplicated data segment within the deduplicated storage system.

2. The method of claim 1, wherein:
    the configuration file stores at least the metadata for the target file;
    the original location of the configuration file comprises a metadata directory.

3. The method of claim 1, wherein:
    the configuration file stores at least the extent map for the target file;
    the original location of the configuration file comprises a map directory.

4. The method of claim 1, wherein:
    the original location of the configuration file comprises a directory;
    the snapshot location of the configuration file comprises a subdirectory of the directory.

5. The method of claim 4, wherein the subdirectory of the directory is created in response to receiving the request to take the snapshot.

6. The method of claim 4, wherein creating the subdirectory of the directory comprises assigning the subdirectory a name of the snapshot that was assigned to the snapshot prior to creating the subdirectory.

7. The method of claim 1, wherein the at least one configuration file comprises:
    a file storing the metadata for the target file;
    a separate file storing the extent map for the target file.

8. The method of claim 1, further comprising:
    identifying, by the deduplicated storage system, the deduplicated data segment referenced by the snapshot of the target file;

marking, by the deduplicated storage system, the deduplicated data segment as referenced by the snapshot of the target file to prevent removal of the deduplicated data segment.

9. The method of claim 8, further comprising marking, by the deduplicated storage system, each deduplicated data segment referenced by the snapshot of the target file as referenced by the snapshot of the target file to prevent removal of the respective deduplicated data segment.

10. The method of claim 1, further comprising:
modifying content of the snapshot;
modifying the extent map stored at the snapshot location to reference both:
an additional deduplicated data segment that the snapshot newly references due to the modifying;
an additional deduplication container storing the additional deduplicated data segment separate from an original deduplication container storing the deduplicated data segment of the snapshot prior to the modifying.

11. A system comprising:
a maintenance module, stored in memory, that maintains a deduplicated virtual file system that stores, at an original location within a non-virtual file system, at least one configuration file storing metadata for a target file and an extent map for the target file, the extent map defining how to construct the target file from deduplicated data segments in a deduplicated storage system;
a reception module, stored in memory, that receives a request to take a snapshot of the target file corresponding to the configuration file;
a copying module, stored in memory, that copies, in response to receiving the request to take the snapshot of the target file, the configuration file storing metadata for the target file and the extent map for the target file into a snapshot location within the non-virtual file system that is different than the original location;
a transmission module, stored in memory, that transmits, in response to receiving the request to take the snapshot of the target file, a file reference request to the deduplicated storage system to add a file reference within the deduplicated storage system, the file reference indicating that the snapshot of the target file references at least one deduplicated data segment within the deduplicated storage system;
at least one physical processor configured to execute the maintenance module, the reception module, the copying module, and the transmission module.

12. The system of claim 11, wherein:
the configuration file stores at least the metadata for the target file;
the original location of the configuration file comprises a metadata directory.

13. The system of claim 11, wherein:
the configuration file stores at least the extent map for the target file;
the original location of the configuration file comprises a map directory.

14. The system of claim 11, wherein:
the original location of the configuration file comprises a directory;
the snapshot location of the configuration file comprises a subdirectory of the directory.

15. The system of claim 14, wherein the subdirectory of the directory is created in response to receiving the request to take the snapshot.

16. The system of claim 14, wherein the copying module creates the subdirectory of the directory by assigning the subdirectory a name of the snapshot that was assigned to the snapshot prior to creating the subdirectory.

17. The system of claim 11, wherein the at least one configuration file comprises:
a file storing the metadata for the target file;
a separate file storing the extent map for the target file.

18. The system of claim 11, wherein the deduplicated storage system is programmed to:
identify the deduplicated data segment referenced by the snapshot of the target file;
mark the deduplicated data segment as referenced by the snapshot of the target file to prevent removal of the deduplicated data segment.

19. The system of claim 18, wherein the deduplicated storage system is programmed to mark each deduplicated data segment referenced by the snapshot of the target file as referenced by the snapshot of the target file to prevent removal of the respective deduplicated data segment.

20. A non-transitory computer-readable medium comprising one or more computer-readable instructions that, when executed by at least one processor of a computing device, cause the computing device to:
maintain a deduplicated virtual file system that stores, at an original location within a non-virtual file system, at least one configuration file storing metadata for a target file and an extent map for the target file, the extent map defining how to construct the target file from deduplicated data segments in a deduplicated storage system;
receive a request to take a snapshot of the target file corresponding to the configuration file;
copy, in response to receiving the request to take the snapshot of the target file, the configuration file storing metadata for the target file and the extent map for the target file into a snapshot location within the non-virtual file system that is different than the original location;
transmit, in response to receiving the request to take the snapshot of the target file, a file reference request to the deduplicated storage system to add a file reference within the deduplicated storage system, the file reference indicating that the snapshot of the target file references at least one deduplicated data segment within the deduplicated storage system.

* * * * *